United States Patent [19]

Niiyama

[11] Patent Number: 5,247,858
[45] Date of Patent: Sep. 28, 1993

[54] HYDRAULIC RELIEF VALVE FOR A HYDRAULIC CLUTCH

[75] Inventor: Tsunefumi Niiyama, Saitama, Japan

[73] Assignee: Honda Giken Kogyo Kabushiki Kaisha, Tokyo, Japan

[21] Appl. No.: 802,692

[22] Filed: Dec. 2, 1991

Related U.S. Application Data

[63] Continuation of Ser. No. 686,266, Apr. 15, 1991, abandoned, which is a continuation of Ser. No. 288,289, Dec. 22, 1988, abandoned.

[30] Foreign Application Priority Data

Dec. 22, 1987 [JP] Japan ............................... 62-324974

[51] Int. Cl.$^5$ ........................................... B60K 41/06
[52] U.S. Cl. ...................................... 74/868; 74/867; 192/87.13
[58] Field of Search ................... 74/867, 868, 869; 192/87.11, 87.13, 87.19, 109 F

[56] References Cited

U.S. PATENT DOCUMENTS

| | | | |
|---|---|---|---|
| 3,882,738 | 5/1975 | Audiffred, Jr. et al. | 192/87.13 X |
| 4,186,627 | 2/1980 | Kuramochi | 74/869 |
| 4,253,553 | 3/1981 | Yamada et al. | 192/87.19 X |
| 4,756,213 | 7/1988 | Mainquist et al. | 74/867 X |

FOREIGN PATENT DOCUMENTS 52-21131 6/1977 Japan.
61-84450 4/1986 Japan.

*Primary Examiner*—Richard M. Lorence
*Assistant Examiner*—Benjamin Levi
*Attorney, Agent, or Firm*—Lyon & Lyon

[57] ABSTRACT

A hydraulic relief valve according to the invention comprises; a housing having a clutch port communicating with a hydraulic chamber of a given hydraulic clutch and a drain port communicating with a drain, a spool inserted in the housing and being movable between an operational position at which the clutch port is isolated from the drain port and a relief position at which the clutch port communicates with the drain port, and biasing means to push the spool toward the operational position. The housing further includes an up-shift port communicating with a hydraulic chamber of an up-shift clutch which is engaged when the speed range is shifted up from the given speed range and a down shift port communicating with a hydraulic chamber of a down-shift clutch which is engaged when the speed range is shifted down from the give speed range. The hydraulic pressure in the chamber of the up-shift clutch is supplied into said housing through the up-shift port to push the spool toward the relief position when the speed range is shifted up. The hydraulic pressure in the chamber of the down-shift clutch is supplied into the housing through the down-shift port to push the spool toward the relief position when the speed range is shifted down.

3 Claims, 3 Drawing Sheets

HYDRAULIC RELIEF VALVE FOR A HYDRAULIC CLUTCH

This application is a continuation application of application Ser. No. 07/686,266, now abandoned, filed on Apr. 15, 1991, which is a continuation of application Ser. No. 07/288,289, filed Dec. 22, 1988, now abandoned.

BACKGROUND OF THE INVENTION

The invention relates to a control valve used for shifting speed range in an automatic transmission.

An automatic transmission has a plurality of gear trains arranged in parallel, one of which is automatically selected to give a speed reduction ratio appropriate for the driving condition. In order to select a desirable gear train and achieve automatic shifting, a hydraulic clutch is used, which is controlled by means of a control valve by controlling the pressure of the operational fluid to be supplied thereinto or drained therefrom. There have been many automatic transmissions using such control valves in the past, as disclosed for example in Japanese Patent Publication No. 52 (1977)-21131.

In automatic shifting in the automatic transmission, the hydraulic pressure in the hydraulic chamber of the clutch which has been in operational engagement (hereinafter referred to as "pre-shift clutch") is relieved by exhausting fluid to a drain, and the operational fluid having a predetermined line pressure is supplied from a pressure line into the hydraulic chamber of the clutch for the gear train set up for the desired speed range (hereinafter referred to as "post-shift clutch"). The operational fluid in the hydraulic chamber of the pre-shift clutch is allowed to escape to the drain by a hydraulic relief valve which is operated by means of the hydraulic pressure supplied from the hydraulic chamber of the post-shift clutch so that the pressure supply from the pressure line into the post-shift clutch chamber may be simultaneously timing with the drainage from the pre-shift clutch chamber.

In the case when the speed range set by the pre-shift clutch is an intermediate speed range, there can be two modes of speed range shifting, i.e., a down-shift to give a greater speed reduction ratio and an up-shift to give a smaller speed reduction ration. Consequently two hydraulic relief valves, one for the down-shift and another for the up-shift, have been conventionally used in an automatic transmission.

The use of two relief valves increases not only a cost to manufacture them but also the space to install them.

SUMMARY OF THE INVENTION

The present invention is therefore directed to provide a single valve which permits the relief of the hydraulic pressure from the pre-shift clutch in both down-shifting and operations. This can be realized based on the fact that the same clutch is used as the pre-shift clutch in relieving the hydraulic pressure in the above operations and down-shifting.

As a means for achieving said object, the hydraulic relief valve according to the invention comprises; a housing having a clutch port communicating with a hydraulic chamber of a given hydraulic clutch and a drain port communicating with a drain, a spool inserted in the housing and being movable between an operational position at which the clutch port is isolated from the drain port and a relief position at which the clutch port communicates with the drain port, and biasing means to push the spool toward the operational position. The housing further includes an up-shift port communicating with a hydraulic chamber of an up-shift clutch which is engaged when the speed range is shifted up from the given speed range and a down shift port communicating with a hydraulic chamber of a down-shift clutch which is engaged when the speed range is shifted down from the give speed range. The hydraulic pressure in the chamber of the up-shift clutch is supplied into the housing through the up-shift port to push the spool toward the relief position when the speed range is shifted up. The hydraulic pressure in the chamber of the down-shift clutch is supplied into the housing through the down-shift port to push the spool toward the relief position when the speed range is shifted down.

When the speed range is shifted up, the above mentioned pressure relief valve permits the hydraulic pressure in the chamber of the post-shift clutch (up-shifted clutch) to act in the up-shift port moving the spool to the relief position, thereby relieving the inner pressure of the hydraulic chamber of the pre-shift clutch (engaging clutch before the up-shifting) by communicating the chamber with the drain. When the speed range is shifted down, the hydraulic pressure in the chamber of the post-shift clutch (down-shifted clutch) acts in the down-shift port to move the spool of the valve to the relief position, thereby communicating, as in the case of up-shifting, the hydraulic chamber of the pre-shift clutch (engaging clutch before the down-shifting) with the drain to relieve the inner pressure therein.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
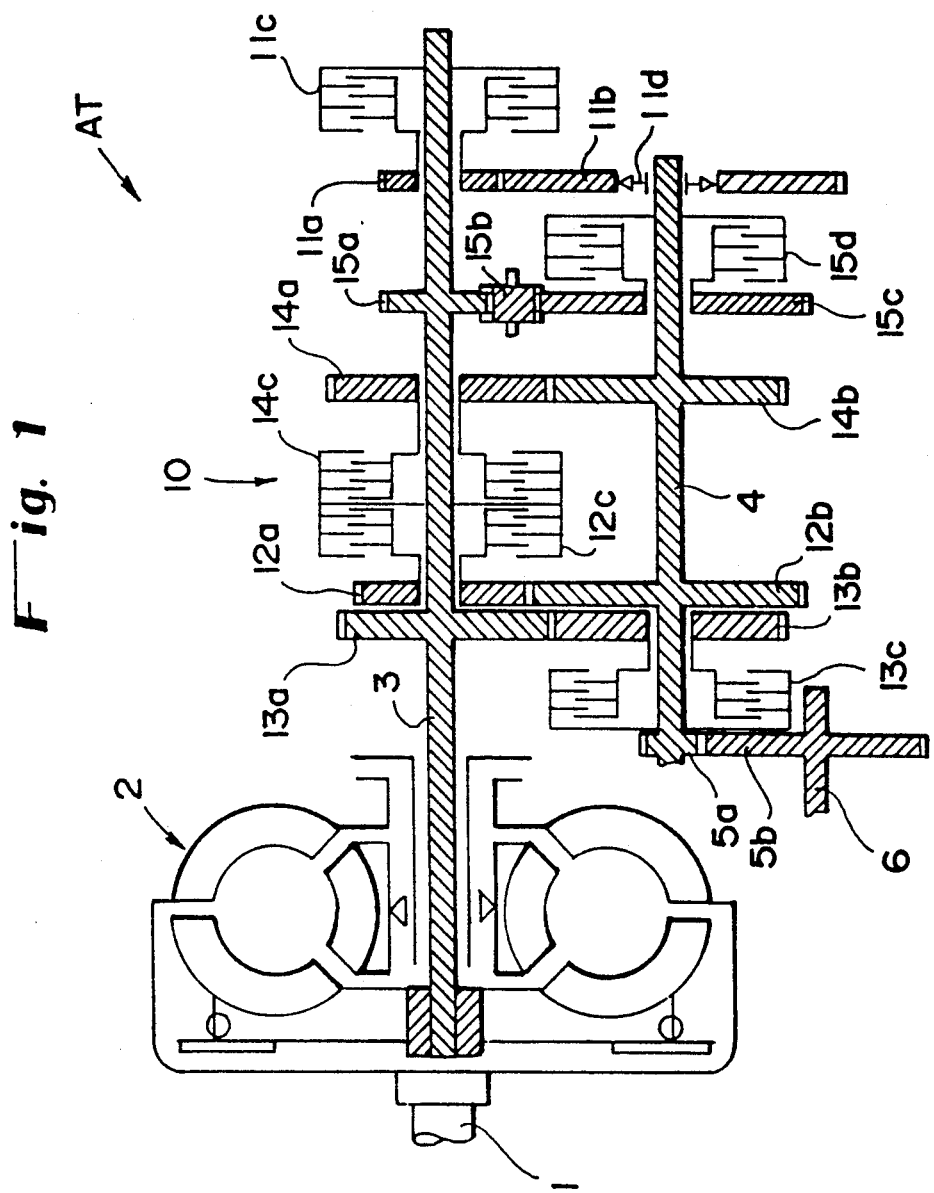
FIG. 1 is a diagrammatic sectional view of an automatic transmission according to the present invention.

FIG. 1 is an outline illustrating the construction of an automatic transmission utilizing the valve according to the invention. In this transmission AT, the engine output power is transmitted from the engine shaft 1 to the output shaft 6 through a torque converter 2 and the speed reduction mechanism 10 having a multiplicity of gear trains by which the rotational speed is changed. Specifically, the output power of the torque converter 2 is given to the main shaft 3. Then it is transmitted to the counter shaft 4 arranged in parallel with the main shaft 3 after it is changed in speed by means of one of five gear trains disposed between the main shaft 3 and the counter shaft 4. The output power is further transmitted to the output shaft 6 through output gear trains 5a and 5b disposed between the counter shaft 4 and the output shaft 6.

The above five gear trains disposed between the main shaft 3 and the counter shaft 4 include a first range gear train 11a and 11b, a second range gear train 12a and 12b, a third range gear train 13a and 13b, a fourth range gear train 14a and 14b, and a reverse range gear train 15a, 15b and 15c. The gear trains are respectively provided with hydraulically operable clutches 11c, 12c, 13c, 14, and 15d to allow the transmission of the power through the gear trains. The first range gear train 11b is provided with a one-way clutch 11d. Thus, by selectively putting one of these five gear trains in operation, a desirable shift control may be achieved.

Figure 2:
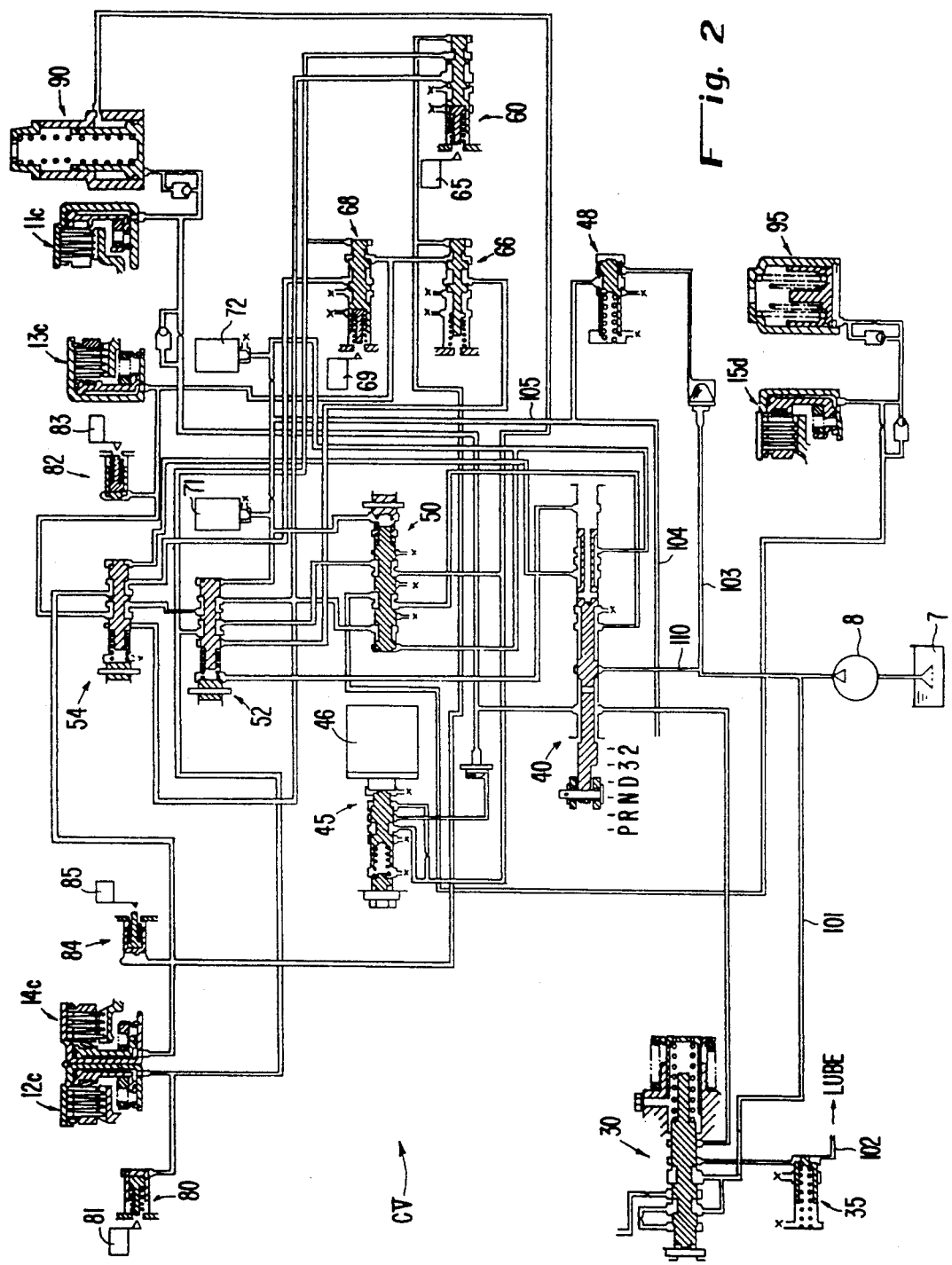
FIG. 2 is a hydraulic circuit diagram of a control valve used in the above automatic transmission.

The control of the selective operation of the hydraulic clutches mentioned above is managed by a control valve CV, which will be described hereinafter reference to FIG. 2.

In the control valve CV, the operational fluid supplied by the pump 8 from an oil sump 7 is led through a line 101 into a regulator valve 30 which functions to regulate the fluid pressure to a predetermined line pressure. The fluid having the line pressure is led to the manual valve 40 through the line 110. Then the fluid is supplied, via various valves in the control valve CV, to a selected one of hydraulic clutches 11c, 12c, 13c, 14c, and 15d in accordance with the required driving condition, thereby controlling the operation of the clutch.

These various valves in the control valve CV will be described below. A check valve 35 is disposed in the downstream of the regulator valve 30 and prevents the pressure of the fluid for lubrication supplied to the transmission through a line 102 from exceeding a predetermined pressure. A modulator valve 48 reduces the line pressure of the fluid supplied through a line 103 to a predetermined modulator pressure, and supplies this operating fluid having the modulator pressure to a lock-up clutch control circuit (not shown), via a line 104, to control the lock-up clutch in the torque converter 2. The fluid having modulator pressure is also supplied to a line 105 for shift control.

A manual valve 40 is operable in response to the shift lever manipulated by the driver, and may take either one of 6 positions, P, R, N, D, S, and 2. The fluid having the line pressure from the line 110 is selectively supplied to the following valves in correspondence with the above positions.

A 1-2 shift valve 50, a 2-3 shift valve 52, and a 3-4 shift valve 54 are operated when the manual valve 50 is in either one of D, S, or 2 position by the action of the modulator pressure supplied in accordance with the ON-OFF actuation of a first and a second solenoid valve 71 and 72. These valves 50, 52, 54 are provided for controlling the supply of the line pressure fluid to the first through the fourth clutches 11c, 12c, 13c and 14c, thereby a shift control is carried out by operating the valves 50, 52, and 54.

A clutch pressure control valve 45 is used for changing the pressure of the fluid to be supplied to the clutches 11c-14c to a desirable pressure by means of a linear solenoid 46, thereby preventing travelling shocks caused by shifting. Also, the clutch capacity can be appropriately adjusted by changing the above pressure to a desirable pressure in correspondence with the engine throttle opening.

A first through a third orifice control valves 60, 66, and 68 relieve the hydraulic pressure in the pre-shift clutch during shifting in a manner timed with the building up of the pressure in the post-shift clutch. The first orifice control valve 60 relieves the pressure in the hydraulic chamber of the third clutch 13c at the time of down-shift from the third to the second speed range as well as up-shift from the third to the fourth speed range. The second orifice control valve 66 relieves the pressure in the hydraulic chamber of the second clutch 12c at the time of up-shift from the second to the third speed range or from the second to the fourth speed range. The third orifice control valve 68 relieves the pressure in the hydraulic chamber of the fourth clutch 14c at the time of down-shift from the fourth to the third speed range or from the fourth to the second speed range. It is noted that electric switches 65 and 69 are provided at the left ends of the first and the third orifice control valve 60 and 68, respectively. These switches detect the shifting and are switched on in response to the movement of the spools in the respective valves, generating signals to reduce the engine output power to prevent the traveling shocks during shifting.

The first clutch 11c and the reverse clutch 15d are connected with accumulators 90 and 95, respectively, which prevent the traveling shocks during shifting by moderating the hydraulic pressure change encountered in the operation of the clutches 11c and 15d. The second through the fourth clutches 12c-14c are connected with clutch pressure switches 80, 82 and 84 respectively. The motions of the spools of the switches 80, 82, and 84 are detected by electric switches 81, 83, and 85 respectively to detect the starting up of the shifting operations of the clutches 12c-14c. Based on this detection, a starting time of controlling the line pressure by the clutch pressure control valve 45 is determined.

In the control valve CV thus constituted, the above mentioned valves are operated in response to the operation of the manual valve 40 initiated by the shift lever manipulation, and to the ON-OFF operation of the solenoid valves 71 and 72, resulting in the selective supply of the line pressure to the corresponding one of the clutches 11c-15d for automatic shifting. This is however, known to those skilled in the art and not described further.

Figure 3:
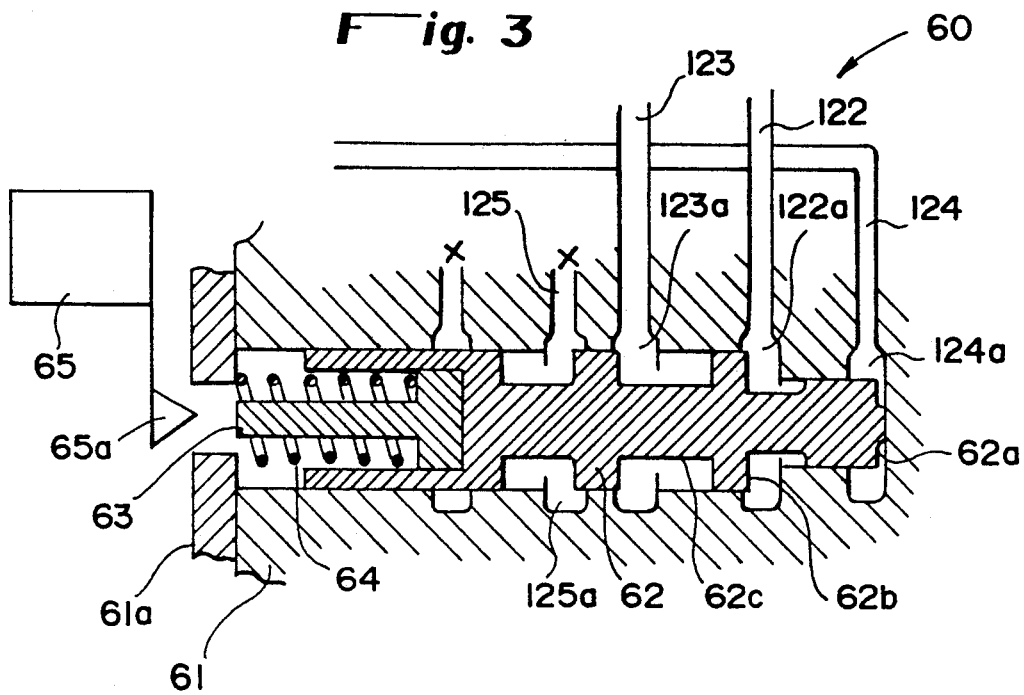
FIGS. 3 and 4 are sectional views of orifice control valves used in the above control valve.

The first orifice control valve 60 in the control valve CV corresponds to the hydraulic relief valve according to this invention, which will be now described in detail with reference to the FIGS. 3 and 4.

The valve 60 comprises a housing 61, a spool 62 inserted in the housing 61 movably to the right and left as seen in the figures, a spring 64 abutting on the left side of the spool 62 to push it to the right, and an electric switch 65 which has an arm 65a facing the protrusion 63 formed on the left end of the spool 62. The switch 65 will be turned ON by the arm 65a pushed by the left protrusion 63 of the spool 62 as the spool 62 is moved to the left.

In the housing 61, there is formed a clutch port 123a communicating with the third clutch 13c via a line 123, a drain port 125a communicating with the drain via line 125, a down-shift port 122a communicating with the second clutch 12c via a line 122, and an up-shift port 124a communicating with the fourth clutch 14c via a line 124.

We now explain the case where the valve 60 described above is in a state of the third range. In this case, the hydraulic pressures in the pressure chambers of the second and the fourth clutches 12c and 14c are both zero, and so are the pressures in the down-shift and up-shift ports 122a and 124a. As a result, the spool 62 is biased by the spring force to the right as shown in the FIG. 3. The clutch port 123a opens into the groove 62c of the spool 62. Since the groove 62c is presently closed by the spool 62, the communication between the clutch port 123a and the drain port 125a is interrupted. Namely, the spool 62 is in the operational position, and therefore the fluid having the predetermined hydraulic line pressure is supplied to the third clutch 13c. This pressure is maintained therein, enabling the third clutch 13c in engagement to transmit the power through the gear train 13a and 13b.

Now the case of the up-shift from the third speed range to the fourth speed range is explained. In this case, the shift valve is operated, supplying the line pressure to the fourth clutch 14c. As the inner pressure in the fourth clutch 14c builds up, this pressure is conveyed to the up-shift port 124a via the line 124. The hydraulic pressure supplied to the port 124a acts on the right end 62a of the spool 62 to move the spool to the left against the spring force as shown in FIG. 4. As the spool 62 is moved to the relief position (to be left), the clutch port 123a and the drain port 125a are in communication with each other, and the hydraulic pressure in the third clutch 13c is drained as the pressure in the hydraulic chamber of the fourth clutch 14c is increased, thereby disengaging the third clutch 13c but bringing the fourth clutch 14c in engagement to carry out the up-shift.

The down shift from the third speed range is now explained, which contrasts with the above cases. In this case, the second clutch 12c is supplied with the line pressure. As the inner pressure of the clutch 12c begins to build up, the pressure is supplied to the down-shift port 122a via the line 122. The pressure supplied to the port 122a acts on the stepped portion 62b so as to move the spool 62 to the relief position as shown in FIG. 4 against the biasing force of the spring 64. This makes the clutch port 123a communicate with the drain port 125a and drain the fluid in the hydraulic chamber of the third clutch 13c, in response to the pressure increase in the hydraulic chamber of the second speed clutch 12c, thereby carrying out the down-shift.

Figure 4:
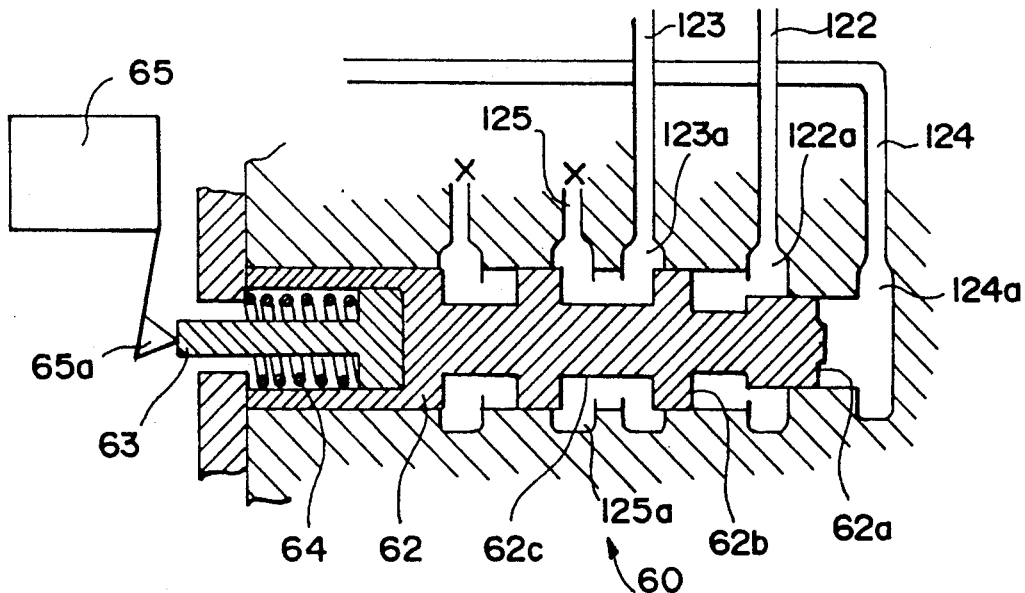

When the spool 62 is moved to the left, i.e., to the relief position, as shown in FIG. 4 during said up-shift or down-shift, the left end 63 of the spool pushes the arm 65a of the electric switch 65 to turn ON the switch. This ON operation establishes a signal indicative of the start of the shifting and is used to control (or retard) the engine output power during the shifting, which helps to suppress the traveling shocks during shifting.

As described above, during up-shifting, the up-shift port is supplied with the inner pressure in the hydraulic chamber of the post-shift clutch, to move the spool to the relief position. The hydraulic chamber of the pre-shift clutch is in communicated with the drain to relieve the pressure in the chamber. On the other hand, during down-shifting, the hydraulic pressure in the post-shift clutch is led to the down-shift port to move the spool to the relief position, establishing the communication, as in the above, between the hydraulic chamber of the pre-shift clutch and the drain to relieve the pressure in the chamber. Accordingly this single valve serves to relieve the pressure in both the up-shifting and down-shifting operations helping reduce the manufacturing cost and the dimensions of the control valve.

The invention being thus described, it will be obvious that the same may be varied in many ways. One variation would be an automatic transmission with 1st, 2nd and 3rd hydraulic clutches by which 1st, 2nd and 3rd speed ranges are set when engaged, the 1st, 2nd and 3rd hydraulic clutches corresponding to the down-shift clutch, the hydraulic clutch and the up-shift clutch respectively. This and other variations are not to be regarded as a departure from the spirit and scope of the invention, and all such modifications as would be obvious to one skilled in the art from the disclosure herein are intended to be included within the scope of the following claims.

What is claimed is:

1. A hydraulic relief valve which relieves operational hydraulic pressure in an off-going hydraulic clutch of an automatic transmission when a speed range is shifted up or down from a given speed range at which said off-going hydraulic clutch is engaged, comprising:

a housing having a clutch port communicating with a hydraulic chamber of said off-going hydraulic clutch and a drain port communicating with a drain;

a spool inserted in said housing and being movable between an operational position at which said clutch port is isolated from said drain port and a relief position at which said clutch port communicates with said drain port;

biasing means to urge said spool toward said operational position;

wherein said housing further includes an up-shift port communicating with a hydraulic chamber of an up-shift clutch which is engaged when the speed range is shifted up from said given speed range and a down shift port communicating with a hydraulic chamber of a down-shift clutch which is engaged when the speed range is shifted down from said given speed range, hydraulic pressure in said chamber of the up-shift clutch being led into said housing through said up-shift port to push said spool toward said relief position when said speed range is shifted up, hydraulic pressure in said chamber of the down-shift clutch being led into said housing through said down-shift port to push said spool toward said relief position when said speed range is shifted down, said spool being moved to said relief position either when the hydraulic pressure in said chamber of the up-shift clutch is led into said housing through said up-shift port or when the hydraulic pressure in said chamber of the downshift clutch is led into said housing through said down-shift port.

2. A hydraulic relief valve as defined in claim 1, wherein said automatic transmission has 1st, 2nd, 3rd and 4th hydraulic clutches by which 1st, 2nd, 3rd and 4th speed ranges are respectively set when engaged, said 2nd, 3rd and 4th hydraulic clutches corresponding to said down-shift on-coming clutch, said off-going hydraulic clutch and said up-shift on-coming clutch respectively.

3. A hydraulic relief valve as defined in claim 1, wherein said automatic transmission has 1st, 2nd and 3rd hydraulic clutches by which 1st, 2nd and 3rd speed ranges are set when engaged, said 1st, 2nd and 3rd hydraulic clutches corresponding to said down-shift on-coming clutch, said off-going hydraulic clutch and said up-shift on-coming clutch respectively.

* * * * *